United States Patent
Cottrell

(10) Patent No.: US 9,805,067 B1
(45) Date of Patent: Oct. 31, 2017

(54) SYSTEM AND METHOD FOR MULTIPLAYER NETWORK GAMING

(71) Applicant: Take-Two Interactive Software, Inc., New York, NY (US)

(72) Inventor: Ian Cottrell, London (GB)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 396 days.

(21) Appl. No.: 13/894,109

(22) Filed: May 14, 2013

(51) Int. Cl.
G06F 17/30 (2006.01)
A63F 13/30 (2014.01)
A63F 13/00 (2014.01)
A63F 13/34 (2014.01)

(52) U.S. Cl.
CPC ........ *G06F 17/30283* (2013.01); *A63F 13/00* (2013.01); *A63F 13/30* (2014.09); *A63F 13/34* (2014.09)

(58) Field of Classification Search
CPC .......... A63F 17/32; A63F 13/00; A63F 13/30; A63F 13/34; G06F 17/30283
USPC .......................................................... 463/42
See application file for complete search history.

(56) References Cited

U.S. PATENT DOCUMENTS

| | | | |
|---|---|---|---|
| 6,493,871 B1* | 12/2002 | McGuire et al. | 717/173 |
| 8,038,535 B2* | 10/2011 | Jensen | 463/42 |
| 8,409,010 B2* | 4/2013 | Clowes et al. | 463/42 |
| 8,480,498 B2* | 7/2013 | Fiedler | 463/42 |
| 8,568,238 B2* | 10/2013 | Walker et al. | 463/42 |
| 2001/0003715 A1* | 6/2001 | Jutzi et al. | 463/40 |
| 2006/0092942 A1* | 5/2006 | Newson et al. | 370/392 |
| 2009/0262137 A1* | 10/2009 | Walker et al. | 345/629 |
| 2009/0325712 A1* | 12/2009 | Rance | 463/42 |
| 2010/0113157 A1* | 5/2010 | Chin et al. | 463/42 |

OTHER PUBLICATIONS

League of Legends Wiki, "Patch", Wikipedia, retrieved on Apr. 6, 2015 from Internet at URL<leagueoflegends.wikia.com/wiki/Patch/>.*
Steam, "How does p2p(peer to peer) work and what games use it?", Oct. 8, 2011, retrieved on Dec. 23, 2016 from Internet URL<http://forums.steampowered.com/forums/archive/index.php/t-2163615.html>.*

* cited by examiner

*Primary Examiner* — Dmitry Suhol
*Assistant Examiner* — Ryan Hsu
(74) *Attorney, Agent, or Firm* — Orrick, Herrington & Sutcliffe LLP

(57) ABSTRACT

Disclosed are systems and methods for operating a peer-to-peer multiplayer gaming architecture. Scripts are provided to define multi-player game environments and scenarios. The operation of the multiplayer game is accommodated by the transmission of high-level game events among the multiple players. One player is designated host and charged with maintaining the consistency among the game players. The host role is transferred from one player to another quickly and seamlessly, as needed.

9 Claims, 3 Drawing Sheets

SYSTEM AND METHOD FOR MULTIPLAYER NETWORK GAMING

CROSS REFERENCE TO RELATED APPLICATIONS

This application is submitted concurrently with commonly assigned application Ser. No. 13/894,112, entitled "System and Method for Online Community Management," Ser. No. 13/894,104, entitled, "System and Method for Time Flow Adjustment in Multiplayer Games," and Ser. No. 13/894,099, entitled, "System and Method for Network Gaming Architecture," which are incorporated herein by reference.

FIELD

The present disclosure generally relates to network gaming architectures for multiplayer games. More specifically, the present disclosure describes computerized systems, methods, and apparatuses for peer based distributed execution of multiplayer games. And further to providing a mechanism for host migration in such a system.

BACKGROUND OF THE INVENTION

Early videogames were simple linear single player games following a set storyline. The gaming experience generally ended after the user finished playing through the storyline. The value of the game was, therefore, typically limited to what was provided at the time of distribution. The value of a game is oftentimes measured by the number of hours it takes to complete the single player game, i.e., how long the game can engage the player; similar to a movie's duration. Multiplayer modes of play can extend the gaming experience for the player. Indeed, many games today offer an online multiplayer gaming experience in addition to the single player mode. Multiplayer modes can offer players more playtime since, unlike a single player storyline mode, the player's experience is different with each new opponent. Multiplayer modes can be implemented over the Internet through a network connecting players with other players. While this extends the amount of new and engaging playing time, even multiplayer game modes can become boring and repetitive after time.

Furthermore, multiplayer games often rely on a centralized server to perform game hosting tasks, such as defining game environment, specifying the game objectives, synchronizing game play across the various players, keeping track of game objectives, and scoring. For multiplayer games having large communities of players, the costs and efforts required to maintain these centralized servers can become substantial. Moreover, when demand for multiplayer games rise beyond the amount available server capacity, players are forced to wait or forego multiplayer gaming.

BRIEF SUMMARY OF THE INVENTION

Innovative systems and methods for distributed multiplayer game architectures are disclosed for addressing the above problems. A distributed multiplayer game system allows player consoles acting as network peers to perform multiplayer game coordination functions, such as starting, synchronizing and scoring. Furthermore, when the code defining the multiplayer game is distributed as a game script, new and varied gaming scenarios can be provided without needing to update the game's main executable.

The multiplayer game operates by having the participants in the game run the same game code on their respective gaming machines. Each copy of the script code run by the players in the game runs in parallel. Thus each gaming machine creates a copy of the virtual gaming environment. The game systems must, therefore, also communicate information among themselves in order to create a synchronized shared gaming experience. In a preferred embodiment, these communications are at least partially transmitted in a peer-to-peer fashion among the game players. This synchronizing communication can be accomplished by the transmission and receipt of pertinent event messages related to operation of the multiplayer game among the game peers.

The game events related to management of the high-level aspects of the multiplayer game can be transmitted among the game participants, while low-level game events are handled differently. For example, the higher-level game management events can be broadcast to all players. Meanwhile, low-level game events, such as player movements and interactions between players, are broadcast only to the relevant players. This enables an efficient use of network bandwidth by limiting the distribution of more frequent low-level events to only the players that require that information, while less frequent high-level game management events are transmitted to all players to maintain multiplayer game consistency.

While all the players are running the same script code, one player is selected to act as host. The host performs supervisory functions for the game and is accordingly tasked with unique duties in the game process. In particular, the host coordinates the triggering of high-level game events and responds to queries regarding the game state. The host's copy of the game state acts as the determinative record of the game state for resolving consistency conflicts. In the event that the player acting as the host drops out of the game or has poor network bandwidth, mechanisms are provided to migrate the host to another player. When the host is migrated to a new player, the new host retransmits all high-level events that have occurred since the last successfully received host transmission to the other players. This operation maintains consistency of the game state for all players by making sure all other players have the game state as the new host.

In a further embodiment the game control code for the multiplayer game is distributed via a script file. The script file modifies the distributed game code to allow new modes of game play. The players to the multiplayer game all run the same script for a given game. The players' local copies of the script file is executed by each of their machines roughly simultaneously to create a unified gaming experience for the players.

In one advantageous embodiment a method is provided for participating in a multiplayer peer-to-peer networked game, relying on a preexisting game executable. The method receives a game code file over a network; executes the game code file to generate the multiplayer game environment by initiating commands from the preexisting game executable; executes the game code file to generate high-level game events; transmits the high-level game events to all other participants in multiplayer game; executes the preexisting game executable to transmit individual low-level game events to fewer than all the other participants in the multiplayer game; receives high-level game events and processing the high-level events by executing the game code file; and receives low-level game events and processes the low-level events by executing the preexisting game executable. In a further embodiment host migration is provided by storing a log of at least some of the high-level game events that were transmitted or received, wherein the high-level game events are stored sequentially; initiating host migration by identifying in the log the last high-level event received from a prior host; processing all high-level game events in the log sequentially after the last high-level event received from the prior host by executing host functions in the game code file; transmitting any results from the processing of the high-level events to all other participants in the multiplayer game. In a further embodiment, prior to the processing step, the last high-level event received from the prior host is transmitted to the other participants and any high-level events those participants received from the prior host sequentially after the transmitted high-level event are received by the new host. In another embodiment the received game code file generates a multiplayer game mode not provided by the preexisting game executable. In another embodiment the received game code file creates bindings to the preexisting game code for high-level events specified in the received game code file. In another embodiment the received game code file is script code. In another embodiment host migration occurs based reaching a threshold number of bandwidth complaints regarding the prior host. In another embodiment the high-level events consist essentially of events impacting the multiplayer game state, which cannot be locally generated accurately by all players. In another embodiment the above methods are provided via a nonvolatile computer readable medium for storing processor executable instructions to perform the steps.

In another embodiment is a video game system for providing a multiplayer peer-to-peer networked game, relying on a preexisting game executable. The video game system includes a processor; memory in communication with the processor; a network interface connected with the processor to provide communication with other game systems. Instructions stored in the memory and executable by the processor: receive a game code file over a network; execute the game code file to generate the multiplayer game environment by initiating commands from the preexisting game executable; execute the game code file to generate high-level game events; transmit the high-level game events to all other participants in multiplayer game; execute the preexisting game executable to transmit individual low-level game events to fewer than all the other participants in the multiplayer game; receive high-level game events and process the high-level events by executing the game code file; and receive low-level game events and process the low-level events by executing the preexisting game executable.

DETAILED DESCRIPTION OF THE INVENTION

In the following description of the various embodiments, reference is made to the accompanying drawings, which show by way of illustration various exemplary embodiments that practice the disclosed invention. It is to be understood that other embodiments may be utilized and structural and functional modifications may be made without departing from the scope of the present invention.

Figure 1:
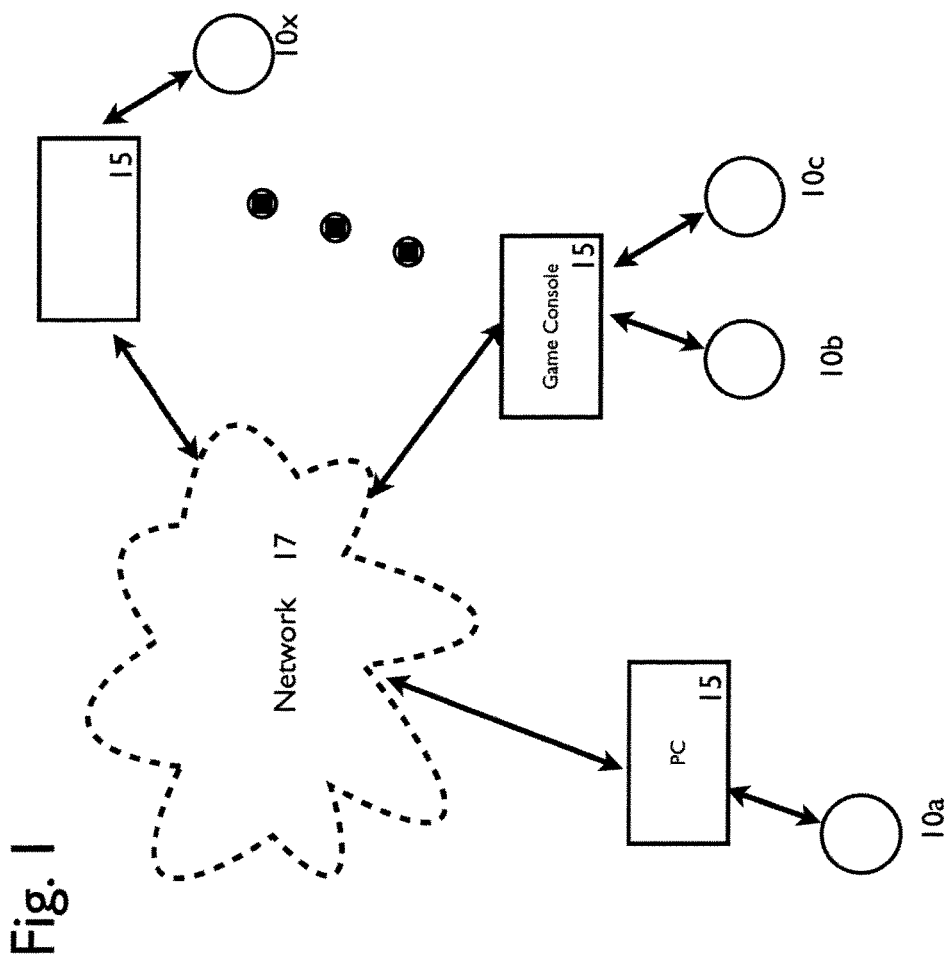
FIG. 1 is a diagram depicting a network structure.

FIG. 1 shows an exemplary architecture in accordance with an embodiment of the disclosed system for multiplayer network gaming. Multiple players 10a-x participate in a combined multiplayer game. The players access the game through a gaming system 15, such as a personal computer, dedicated gaming console, arcade gaming unit, mobile gaming device, mobile phone or other suitable computing environment. These are in communication with one another to play a game. As is known in the art, these gaming systems will have one more CPUs, GPUs, network interfaces, memory, displays, and user controls (such as mice, touch screens, game controllers, video camera's, etc.). These systems are interconnected to, inter alia, execute game code stored in memory, exchange information over the network, and allow the human player to control game events shown on the display through manipulation of game characters via the user controls.

Each of these gaming systems provides the players a view on the virtual game environment. In some cases, a game system might provide multiple views on the virtual game environment for two or more players through a split screen, multiple screens or some other mechanism. Through this hardware the players each control game characters in the virtual game environment. Note, reference to a player performing game functions, herein, is to be understood where appropriate to refer to actions of the players' gaming systems, such references do not necessarily suggest actions that involve, or are even apparent to, the human user of the system.

The multiplayer game is embodied in game code running on each of the participating gaming systems. Each of the player's computing device runs code executing a local copy of the shared virtual world. The multiple copies of the shared virtual world are kept consistent and synchronized by passing messages over the network describing the actions of the various players. In a preferred embodiment, much of the required communications for maintaining operation of the multiplayer game are transmitted over the Internet on a peer-to-peer basis, without the use of a centralized server to mediate the interactions.

In this peer-to-peer environment, bandwidth can be used more efficiently if game events are only transmitted between the players that need them. For example, low-level events detailing players' actions, such as the player's immediate motion and interactions with other players, are often only needed by other players in the immediate vicinity of one another. Moreover, due to the need to track such interactions in real time or near real time these low level events occur at a relatively high rate. Thus, network traffic can be reduced if detailed information regarding the movements and actions of players in a region of the virtual world far from the perception of a given player are not transmitted to that player. In contrast, high-level events pertinent to overall game play, such as game scoring, occur more infrequently and can be broadcast among all the players. Segregating game events, in this way, based on frequency and need for the information can help optimize efficient use of network resources.

This segregation is accomplished in a preferred embodiment by providing a multiplayer game script. Script code is an efficient mechanism for adapting existing game code to create varied new game play. For example, a script can access existing game code to create an environment from the single player version of a game and populate it with the players participating in the multiplayer game, as well as other game elements appropriate for the game (such as weapons, vehicles, monsters, etc.). In order for the existing game code to operate the script, the existing game code includes a script runtime process that is responsible for execution of the scripts by providing infrastructure such as, handling the event queue relevant to the script, creating the event watchers that trigger based on event bindings, providing wait timers, and performing host migration routines. In other words, this code provides a framework for the synchronous execution of scripts and enables the scripts to be executed in parallel across games systems associated with each of the players.

The script can further provide or access different rules for creating various styles of multiplayer games (such as capture the flag, death match, last man standing). For example, a multiplayer script that creates a capture the flag style game (where the flag needs to be located and carried to some portion of the game) would operate as follows. It is assumed that the underlying game has existing game code for different environments, weapons and characters. The script will start by choosing a game environment, placing the flag in the environment, adding other optional game elements and gathering the players participating in the game. In some circumstances the host might run code that randomizes or otherwise specifies game elements, such as items in the virtual environment or the starting location for each of the players. One or more high-level game events are be communicated to the other players noting these specifications. The multiplayer game script could also transmit events from each of the players signifying that they are ready to begin the game. The host could then send a start event. Other relevant high-level game events managed by the multiplayer game script might include: events signaling that one player has killed another player (especially, where that statistic is used for scoring), resurrection of a player as they re-enter the game, flag captured, flag brought to goal, or game end.

A more detailed exemplary process of event handling by the script is now provided in the context of a capture the flag style game. In particular, the process involves binding, or associating, certain high-level events with specific game code routines used to process the event. A high-level event watcher routine processes the high-level events and triggers the code corresponding to the binding.

1. The script selects a position to spawn the flag, with the selected position being sent from the host via an "observation" event method (in this case, it would be that the GET_RANDOM_INT function is an observation, which returns the host's random selection of an index corresponding to static flag locations)
2. The script then tells the underlying game code to create the flag as a synchronized object with an ID, and returns the EVENT_INDEX for future reference
3. The script then asks the underlying game code for a 'binding' relative to that EVENT_INDEX, such OBJECT_PICKED_UP and specifies a callback function in script to execute when the high-level event watcher in code detects that criteria has been met
4. If that object is picked up, the high-level event watcher on the host transmits an event to all players and executes the callback function and data payload specified in the binding.
5. This triggers a callback in the script that executes the function, passes relevant payload data to the script for processing
6. At this point, the script can perform various logic, such as creating a drop-off point for the flag, which involves steps similar to those starting at step 2 to create a binding for ON_TRIGGER_VOLUME_ENTERED to identify when a player enters the drop-off point.

In some embodiments, it might be advantageous to employ a function that lets a player transmit information outside of the normal event-processing infrastructure. For example, assuming that script logic generates a EndOfGame event when one of the players accomplishes the goal set by the script, it might be disadvantageous for the player's local instance of game to immediate run the code required by the EndOfGame process (e.g., drop out of the game) before the other players. Thus, a "side-channel" is provided to communicate to the host to induce the host to create an event, e.g., _INDUCE_EVENT(EndOfGame). This command will relay the trigger to just the host. The host will then issue the EndOfGame event, which will be processed by all players, including the player that generated the event. This can similarly be used to send commands to enter or respawn a character into the game.

In addition, events can be transmitted to assist in maintaining consistency for the multiplayer game. A player, for example, can transmit an event requesting game state information, such as the location of other players. These location events can then be used to mediate the low-level event handling. A player entering a new area of the map, for example, can request the location of other players in that area. This would allow the player entering the new map area to join the low-level peer-to-peer communications between the subset of players in the new area.

Figure 2:
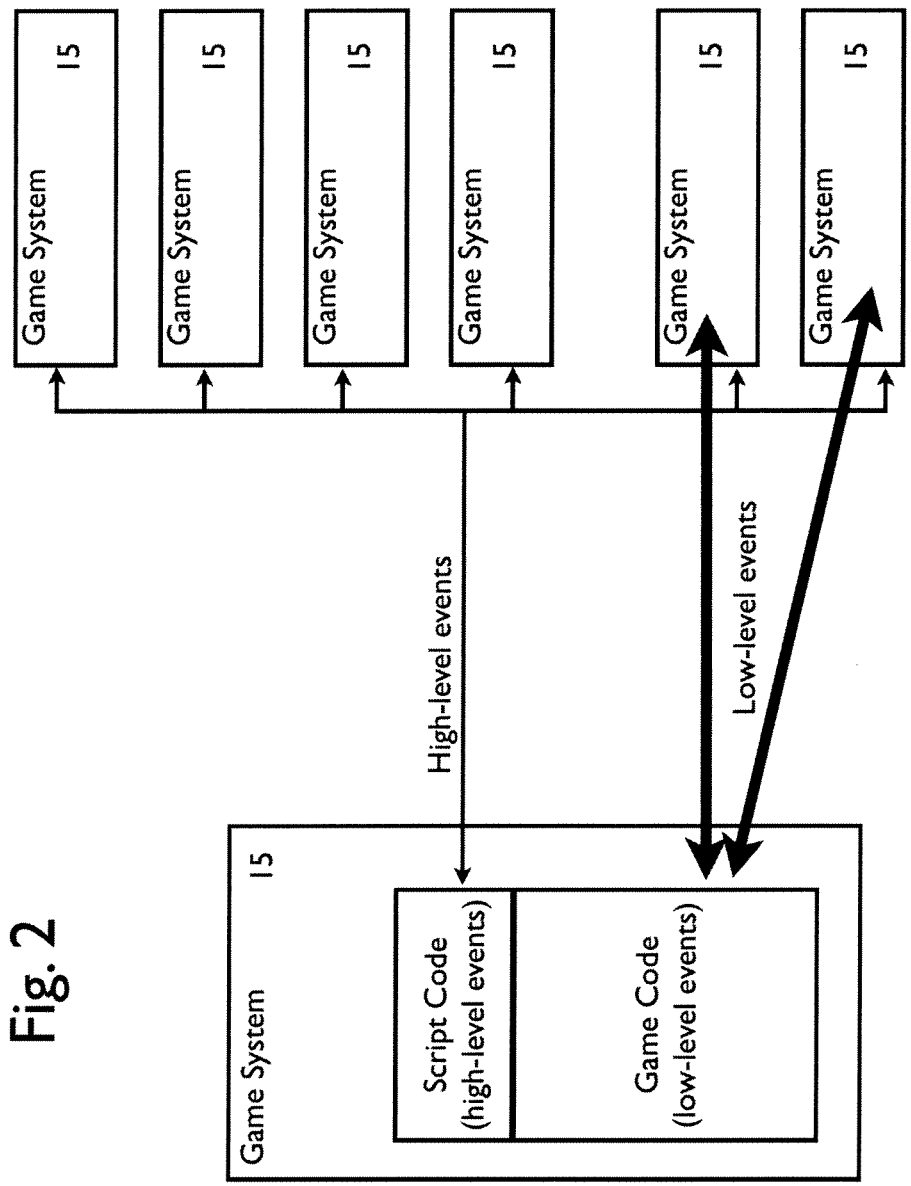
FIG. 2 shows exemplary event transmission.

FIG. 2 shows an exemplary embodiment of a game system's execution of script code in accordance with the disclosed systems. The game system 15 includes memory containing script code and game code. Consistent with the prior discussions, the high-level events generated by processing the script code are transmitted to all game-systems participating in the multiplayer game, while the low-level events generated by the game code are transmitted to a subset of relevant players. The script code generates high-level events for transmission to the other players as it is executed in accordance with the operation of the game. Dispatch code is also provided to process high-level events received from other players. For example, if a game score event is received the dispatch code will pass the event to further script code that will update the score count in the player's user interface.

In a preferable embodiment, the high-level events are sequentially numbered. Sequential numbering is useful in maintaining consistency. As players receive numbered high-level events, should a player receive an event that is out of sequence from the prior events, e.g. receiving event 50 when the last event was 48, it can place the out of order event 50 in a queue and wait to proceed until event 49 is received. The players acknowledge receipt of the particular events. A time out can be employed that drops players if they do not acknowledge receipt of the event prior to the time out. Alternately, an embodiment can provide the ability for the player to query the host to retransmit the intervening events. The host would then retransmits its record of the events to resynchronize the out of sync player. Optionally, players that are too far out of sync, e.g., players that have missed 10 events, can simply be dropped from the game.

Because the host is just another game peer, it may on occasion be advisable to migrate from one host to another. Situations where a host migration might be advisable include, the player acting as host leaves the game, a player with better bandwidth than the current host is available to take the hosting role, the host's network latency increases, or the host's connection becomes unreliable. One mechanism to trigger host migration is to have peers communicate difficulty communicating with the host and initiating host migration after a threshold number of peers signal such difficulty. Host migration can be signified by a high-level host migration event transmitted to the players.

Consistency must be maintained during the host migration. This could be accomplished by transferring the prior hosts game state information to the new host. This solution however suffers from some problems. Transmitting all the relevant game state information requires a relatively large amount of data, which may slow down or pause the game while the data is transferred to the new host and initialized. Moreover, if the prior host drop out of the game unexpectedly, there may be no time to transmit the game state data.

Figure 3:
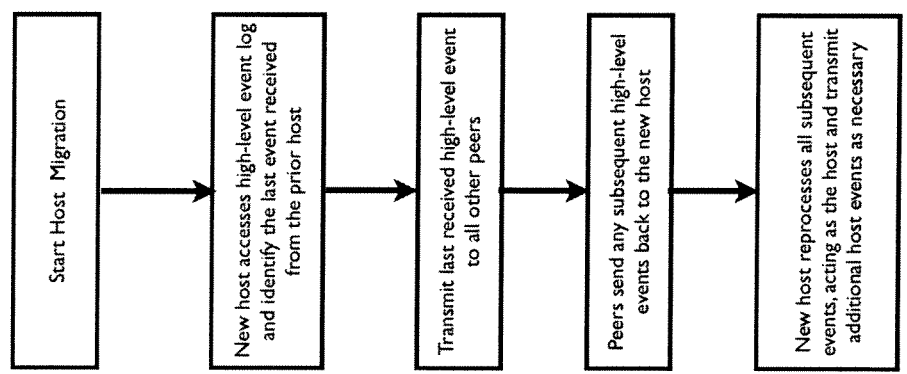
FIG. 3 shows an exemplary host migration method.

In accordance with another preferred embodiment, host migration can be efficiently accomplished as shown in FIG. 3. The method takes advantage of the fact that all the multiplayer peers have a synchronized copy of the game with respect to the high-level events. Thus, there is no need to transfer a large set of state data. A peer is selected act as host and host migration is started. High-level events may have occurred that were not processed by the prior host due to poor connection or because the host dropped from the game. The new host must, therefore, resynchronize events for consistency. The new host accesses its log of the high-level events to identify the last event it received from the prior host. The new host then retransmits this last event to the other players. The other players compare this event to the events they received from the prior host and send any subsequent events back to the new host. The new host then processes any received subsequent events, as the host, and transmits any resulting host events to the other players. The players reprocess the new hosts events and become synchronized.

In a further embodiment, the system can be configured to differentiate segments of the script code based on whether or not they require interaction with events. This makes it easier to ensure that the script code will run with synchronicity. Script code that does not require network communication is marked as "Isolated". Underlying game code commands are tagged based on their interaction requirements, such as 'safe' (signifying commands that do not change the game state), 'action' (signifying commands that change the game state but do not require high-level event data can be run not 'Isolated'), 'observation' (signifying commands that require the host to provide a response and must not be 'Isolated') and 'local' (signifying commands that should be run 'Isolated'). Marking script code as 'Isolated,' or not, and tagging the interaction requirement of commands allows the developers to maintain consistent parallel script execution across all the machines. This is done by generating errors when commands are executed in a part of the script that is inconsistent with the 'Isolated' state. In particular, 'observation' events strictly need host information to maintain a consistent game state across the various players' machines because a particular machine cannot reliably generate that data without host input. Examples, of 'observation' commands include: random numbers that define game criteria (the host's machine generates the random number), player positions, player health values, and game object states (e.g., flag is picked up). The host provides the canonical resource for this 'observation' data and getting this data from the host ensures identical script execution across the different game machines. Thus, any 'observation' commands that are triggered during an 'Isolated' part of the script suggest possible errors that might require correction.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method for participating in a multiplayer peer-to-peer networked game, relying on a preexisting game executable comprising:

receiving a game code file over a network;

executing the game code file to generate a multiplayer game environment of the multiplayer peer-to-peer networked game by initiating commands from the preexisting game executable;

executing the game code file to generate a first set of game events;

transmitting, from a host dynamically selected from a peer of the multiplayer peer-to-peer networked game, the first set of game events to all other participants in the multiplayer peer-to-peer networked game;

executing the preexisting game executable to transmit a second set of game events to fewer than all the other participants in the multiplayer peer-to-peer networked game;

receiving the first set of game events and processing the first set of events by executing the game code file;

receiving the second set of game events and processing the second set of game events by executing the preexisting game executable;

storing a log of at least some of the first set of game events that were transmitted or received, wherein the first set of game events are stored sequentially;

initiating host migration by identifying in the log the last event of the first set received from the host;

processing all of the first set of game events in the log sequentially after the last event of the first set received from the host by executing host functions in the game code file; and transmitting any results from the processing of the first set of game events to all other participants in the multiplayer game.

2. The method of claim 1 further comprising, prior to the processing step, transmitting the last event of the first set received from the host to the other participants and receiving from the participants any of the first set of events those participants received from the host sequentially after the transmitted first set event.

3. The method of claim 1 wherein executing the received game code file generates a multiplayer game mode not provided by the preexisting game executable.

4. The method of claim 1 wherein the received game code file creates bindings to the preexisting game code for the first set of events specified in the received game code file.

5. The method of claim 1 wherein the received game code file is script code.

6. The method of claim 1 wherein the host migration occurs based reaching a threshold number of bandwidth complaints regarding the prior host.

7. The method of claim 1 wherein the first set of events consist essentially of events impacting the multiplayer game state, which cannot be locally generated accurately by all players.

8. A non-transitory nonvolatile computer readable medium for storing processor executable instructions to provide a multiplayer peer-to-peer networked game, relying on a preexisting game executable comprising:

instructions for receiving a game code file over a network;

instructions for executing the game code file to generate a multiplayer game environment of the multiplayer peer-to-peer networked game by initiating commands from the preexisting game executable;

instructions for executing the game code file to generate a first set of game events;

instructions for transmitting, from a host dynamically selected from a peer of the multiplayer peer-to-peer networked game, the first set of game events to all other participants in the multiplayer peer-to-peer networked game;

instructions for executing the preexisting game executable to transmit a second set of game events to fewer than all the other participants in the multiplayer peer-to-peer networked game;

instructions for receiving the first set of game events and processing the first set of events by executing the game code file;

instructions for receiving the second set of game events and processing the second set of game events by executing the preexisting game executable;

instructions for storing a log of at least some of the first set of game events that were transmitted or received, wherein the first set of game events are stored sequentially;

instructions for initiating host migration by identifying in the log the last event of the first set received from the host;

instructions for processing all of the first set of game events in the log sequentially after the last event of the first set received from the host by executing host functions in the game code file; and instructions for transmitting any results from the processing of the first set of game events to all other participants in the multiplayer game.

9. A video game system for providing a multiplayer peer-to-peer networked game, relying on a preexisting game executable comprising:

a processor;

memory in communication with the processor;

a network interface connected with the processor to provide communication with other game systems;

instructions stored in the memory and executable by the processor comprising:

instructions for receiving a game code file over a network;

instructions for executing the game code file to generate a multiplayer game environment of the multiplayer peer-to-peer networked game by initiating commands from the preexisting game executable;

instructions for executing the game code file to generate a first set of game events;

instructions for transmitting, from a host dynamically selected from a peer of the multiplayer peer-to-peer networked game, the first set of game events to all other participants in the multiplayer peer-to-peer networked game;

instructions for executing the preexisting game executable to transmit a second set of game events to fewer than all the other participants in the multiplayer peer-to-peer networked game;

instructions for receiving the first set of game events and processing the first set of events by executing the game code file;

instructions for receiving the second set of game events and processing the second set of game events by executing the preexisting game executable;

instructions for storing a log of at least some of the first set of game events that were transmitted or received, wherein the first set of game events are stored sequentially;

instructions for initiating host migration by identifying in the log the last event of the first set received from the host;

instructions for processing all of the first set of game events in the log sequentially after the last event of the first set received from the host by executing host functions in the game code file; and instructions for transmitting any results from the processing of the first set of game events to all other participants in the multiplayer game.

* * * * *